April 15, 1969     R. KAMMÜLLER ET AL     3,439,175
MEASURING DEVICE FOR MEASURING A LAYER OF LIQUID ON A SURFACE
Filed May 26, 1965

Inventors
REINER KAMMÜLLER
BURKHARDT WIRZ
By Hane and Nydick
Attorneys

United States Patent Office 3,439,175
Patented Apr. 15, 1969

3,439,175
MEASURING DEVICE FOR MEASURING A LAYER OF LIQUID ON A SURFACE
Reiner Kammuller, Delft, Netherlands, and Burkhardt Wirz, Munich, Germany, assignors to Roland Offsetmaschinenfabrik Faber & Schleicher AG, Offenbach am Main, Germany, a company of Germany
Filed May 26, 1965, Ser. No. 458,969
Claims priority, application Germany, May 29, 1964, R 37,986
Int. Cl. G01n 21/26, 21/30
U.S. Cl. 250—218
15 Claims

ABSTRACT OF THE DISCLOSURE

A device which measures the thickness of a layer of water on a surface area of a printing plate by sequentially directing a train of measuring light pulses and a train of reference light pulses having a wave length different from that of the measuring pulses upon the surface area to be supervised, and comparing the ratio of the measuring pulses and of the reference pulses as reflected by the layer of water.

---

The present invention relates to a device for measuring the thickness of a layer of moisture such as a layer of water on a light reflecting surface, particularly on a printing plate as used for lithographic printing.

It has been proposed to measure the thickness of the moisture layer on off-set printing plates by placing a small hood or cap upon a stationary printing plate and sucking-off the moisture present on the thus covered area of the plate by means of a stream of dry air. The suckedoff moisture is then trapped in a hygroscopic material and measured by weighing the material. The difficulty with this method is that the press in which the plate is used must be stopped and since the quantity of moisture used in lithographic printing is minute, an appreciable percentage of the initially present moisture will have evaporated before the press can be stopped and the hood or cap applied to the area to be investigated. As a result, it is practically impossible to measure the moisture conditions as actually existing when and while the press is operating and, of course, the operational thickness of the moisture layer is the one that is of real interest.

It is also known to utilize the different absorption characteristics of water for beams of light having wave lengths in the infra-red range different from another for ascertaining the moisture content of a material to be investigated. More specifically, a wave length of $1.93\mu$ as the more strongly absorbing wave length and a wave length of $1.7\mu$ as the less absorbing wave length have been used. However, such utilization of different wave lengths is not suitable for measuring the vary thin moisture layers or films as are present on metal plates used for off-set printing. For this method of printing, more or less grained zinc or aluminum plates and also smooth or polished plates of stainless steel or chromium are widely used. Accordingly, very differently diffused reflections from the surfaces of such plates must be expected and the comparatively low absorption of moisture layers when a wave length of $1.93\mu$ is used, makes the aforementioned method unsatisfactory for practical purpose.

An accurate measuring or supervision of the thickness of the moisture layer on a printing plate is highly useful in off-set printing, especially when finely grained aluminum plates or smooth bimetal plates are used which require only a very light wetting. However, the thinner the moisture layer on the plate is, the more sensitive becomes the printing operation with respect to changes in the moisture layer. Even slight increases in temperature in the inker during printing or changes in the atmospheric environment in the printing room may render an initially correct moisture quantity insufficient and cause off-color printing by the printing plate. To be on the safe side, a printer usually feeds more water than is actually necessary. However, the use of a minimum quantity of water is desirable with respect to the paper since a minimum presence of water results in less swelling of the paper, less risk of causing off-coloring by the printing plate due to dissolved or loosened particles of the paper or its coating and due to a build-up of dissolved or loosened particles on the blanket. A minimum feed of water is also desirable with respect to true coloring, increase of gloss and color density due to a reduced emulsification and an improvement in the color value reproduction due to an improved transfer of dye or ink.

As it is evident, availability of a reliable instrument for measuring the thickness of the moisture layer permits an accurate determination of the actually present quantity of moisture and on the basis of such measurement, an accurate and simple control of feeding the minimally required quantity of moisture. An accurate measuring instrument is particularly useful for use in connection with dampeners operating without contact with the plate. Such dampeners, due to the elimination of the excess water required on the covers or linings of the rollers to effect release of the dye or ink, need then supply to the printing plate only the water quantity which is actually required on the surface of the plate to obtain the release of the ink or dye. The difficulty with using such minimal water layer is that such layer is very sensitive to the ambient conditions as already stated, and hence a particularly accurate control of the thickness of the water layer is of crucial importance. There are known dampeners operating without direct contact, such as condensation type dampeners but in spite of the well known important advantages of such dampeners, they are little used, since the water layer thereof cannot be controlled with an accuracy sufficient to compensate for the practically unavoidable changes in the temperature of the plate and in the humidity of the ambient air.

A truly accurate and reliable moisture layer measuring device also permits use of conventional color measuring and regulating devices for checking printed sheets in off-set printing. As it is well known in off-set printing, the quality of the color density is strongly influenced by the moisture on the plates. Accordingly, meaningful conclusions with respect to changes in the inking or dying can be drawn only when the quantity of the actually present moisture is known. In other words, if the moisture layer can be kept constant by means of an accurate and reliable measuring instrument, it is evident that any changes in the color covering or density which may occur during printing are primarily or exclusively due to changing in the inking-in or dying.

None of the moisture layer measuring instruments as heretofore known is of sufficient accuracy and stability to perform the aforementioned functions in a satisfactory manner.

It is a broad object of the invention to provide a novel and improved device for measuring the thickness of a moisture layer on a surface, which device permits an accurate and reliable continuous measurement of the layer as it actually is present during operation. Such measurement can then be used to supply just enough water, by conventional and well understood means, to maintain the moisture layer within a desired range.

More specifically, the invention provides a device directing a train of monochromic measuring light pulses having a wave length of $2.95\mu$ and a train of monochromic reference light pulses of a wave length different from that wave length upon the same surface area of the material on which a moisture layer is to be investigated.

When wave length of 2.25μ is used, smooth and grained plates have substantially the same reflection factor and the absorption by the water layer is about 15 times greater than when a wave length of 1.93μ is used, as conventional. As a result, the aforementioned dampeners without contact can be safely used.

Both trains of pulses are reflected with a time lag with reference to each other upon a light receiver such as a photoelectric light receiver and the ratio of the measuring pulses and the reference pulses as received by the light receiver is then measured. This ratio constitutes a reliable and accurate function of the moisture layer or film to be measured. A wave length of about 2.55μ has been found to be advantageous for the reference pulses as with this wave length, the reflection from all types of used printing plates is pratically independent of the thickness of a moisture layer thereon.

According to one embodiment of the invention, a rotary disc is interposed into the optical path between a preferably monochromic source of light and the surface area to be investigated. This disc has circumferentially spaced sectors of reflecting surfaces such as mirrors and apertures separated by opaque substantially radially oriented portions of the disc material. As such disc may be very light, a high r.p.m. of the disc can be readily obtained and correspondingly high pulse frequencies.

Light deviating surfaces such as mirrors are disposed optically before and behind the disc. One of the mirrors directs the light pulses passing through the apertures in the disc upon the surface area of the water layer to be measured and the other mirror directs the light pulses reflected by the mirrored sectors on the disc upon the same surface area. A filter system passing light waves of predetermined different lengths is interposed in the optical path between each of said mirrors and the surface area. Filter systems of this kind are generally expensive and delicate. The arrangement of the invention has the advantage that the filter systems can be installed in a stationary and well protected mounting. The pulses formed by light passing through the apertures in the disc constitute the measuring pulses and the pulses formed by light being reflected by the disc mirrors constitute the reference pulses.

The light receiver for receiving the pulses reflected by the area to be investigated may be an indium-arsenide photocell or an indium-antimonide photoelectric resistance. The receiver converts the light pulses received by it into electric signal pulses.

The invention also provides means by which the angle of incidence at which the light pulses impinge upon the surface area to be examined is different from the exit angle. As a result, only the diffused fraction of the reflected light, which is the useful fraction, is measured. The source of light is preferably a line-shaped source such as a Nernst lamp. The line is imaged upon the disc in a substantially radial direction in reference to the rotational axis of the disc. As a result, and in conjunction with the radially oriented mirrored or apertured sectors of the rotary disc, a very deep leading edge of the pulses is obtained. Such steep leading edge is advantageous for the further utilization of the signal pulses.

A gating circuit connected in circuit with the light receiver serves to separate the electric pulse signals received by it from the receiver into signals representing measuring light pulses and signals representing reference light pulses. The gating circuit may be controlled by any control means suitable for the purpose. The invention provides by way of example a control means including a photoelectric pick-up disposed in the optical path either of the measuring light pulses or the reference light pulses. This has the advantage that the control of the gating circuit is independent of the type of drive means used for rotating the disc and also of the rotational speed thereof. Accordingly, any suitable high speed drive may be used, such as a motor operated with pressurized air.

The gating circuit may also be controlled by an oscillator oscillating with substantially the same frequency as the incoming pulses and synchronized by these pulses.

The control of the gating circuit may further be effected by the incoming pulses so that trigger pulses for the gating circuit are shifted in time into the dark interval between the measuring pulses and the reference pulses as caused by the opaque areas between the mirrors and the apertures of the rotary disc. To effect such shifting of the trigger pulses, a pulse delay network may be provided, or the trailing edge of the incoming pulses may be shaped and the pulses further suitably shaped. A measuring device controlled in this manner also does not require a specific type of drive for the rotary disc so that, for instance, a direct current operated drive may be used.

The invention also provides means for measuring of a water layer on a moving object, for instance, on a small surface area of the printing plate used in an operating off-set printing press, or in other words, of a layer on an area which is available only for a short time. Such measuring may be effected, according to the invention, by means of a counter which counts an equal number of pulse signals representing measuring light pulses and of pulse signals representing reference light pulses, respectively. The counter may be started by a starting signal when the small surface area to be examined enters the effective range of the device. The number of pulses is selected in accordance with the available measuring time. Since only a few pulses of either kind are available when the measuring time is short, the indications obtained from the measured data would be considerably falsified unless the number of measuring pulses and reference pulses is maintained equal.

Other and further objects, features and advantages will be pointed out hereinafter and set forth in the appended claims constituting part of the application.

In the accompanying drawing, several preferred embodiments of the invention are shown by way of illustration and not by way of limitation.

Figure 1:
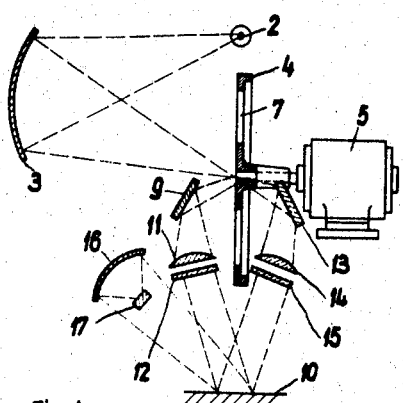
FIG. 1 is a diagrammatic elevational view, partly in section, of a measuring device according to the invention.
Figure 2:
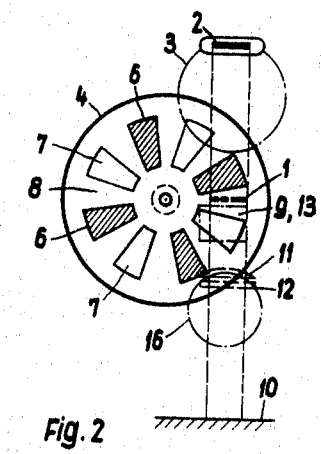
FIG. 2 is a left hand end view of FIG. 1, some of the components of the device being omitted for sake of clarity of illustration.

Referring first to FIGS. 1 and 2 in detail, the measuring device as exemplified comprises a source of substantially monochromic light 2, preferably a line-shaped source of light such as provided by a Nernst lamp. The source of light is imaged by a suitable light reflecting means such as a concave mirror 3 upon a rotary disc 4. This disc is driven by a motor 5. The side of the disc facing mirror 3 has thereon a plurality of preferably sector-shaped light reflecting surfaces 6, such as mirrors adhered to the disc or directly formed thereon. Apertures 7, preferably also sector-shaped, are provided between each two adjacent mirrors 6 and each adjacent aperture and mirror are separated by opaque generally radially oriented disc portions 8. A light deviating member 9, such as a mirror, deflects the light pulses produced by light reflected by the rotating mirrors 6 upon a surface area 10 which may be visualized as part of a printing plate coated with a layer of water, the thickness of which is to be measured. A second light deviating means 13, such as a mirror, deflects the light pulses formed by the light passing the rotating apertures 7 upon the same surface area 10.

The light pulses deflected by mirror 9 constitute reference pulses and the light pulses deflected by mirror 13 constitute measuring pulses.

A lens 11, such as a quartz lens and a filter 12 are interposed into the optical path of the reference pulses between mirror 9 and surface area 10 and similarly a lens 14, such as a quartz lens and a filter 15 are interposed into the optical path of the measuring pulses between mirror 13 and surface area 10. Filter 12 controlling the reference pulses passes light waves having a length of about $2.55\mu$ and filter 15 controlling the measuring pulses passes light waves having a wave length of about $2.95\mu$. The light pulses impinging upon surface area 10 are reflected with diffusion upon a suitable light reflecting means 16, such as a concave mirror which, in turn, reflects the light pulses upon a photoelectric light receiver 17 converting the light pulses into corresponding electric pulses 32. Receiver 17 may be, for instance, indium-antimonide photoelectric resistance as mentioned before.

Figure 3:
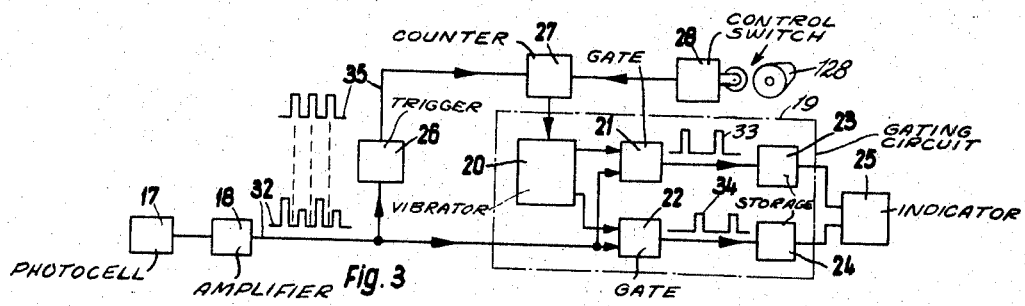
FIG. 3 is a block diagram of the circuitry of the device according to FIG. 1.

As is shown in the block diagram of FIG. 3, the electric signal pulses 32 are first amplified in an amplifier 18 and then fed to a conventional gating circuit 19 including AND-gates or coincidence circuits 21 and 22 and a gate control means 20, such as a bi-stable vibrator. The vibrator controls the opening and closing of gates 21 and 22 so that gate 21 passes only signal pulses 33 representing reference light pulses and gate 22 only signal pulses 34 representing reference light pulses. The pulses are integrated or combined in subsequent storages 23 and 24, such as capacitance type storages and are available as a direct current voltage. A comparing means such as a measuring or indicating instrument 25, for instance, a conventional crossed-coil instrument, measures the ratio of the voltages representing measuring pulses and reference pulses respectively. Instrument 25 may, of course, also be utilized to initiate suitable control functions with respect to the thickness of the water layer on surface area 10 as previously indicated.

The control of the gating circuits by vibrator 20 may be effected by several suitable and conventional means.

According to FIG. 3, a trigger circuit 26 generates trigger pulses 35 from the train of output pulses of amplifier 18. The trigger circuit preferably includes pulse delay networks and pulse shaping means which shift the trigger pulses to the time intervals in which the light from light source 2 impinges upon the opaque areas 8 of disc 4. Suitable and conventional pulse delay and pulse shaping means are described for instance in "Pulse and Digital Circuits," page 174, by J. Millmann and H. Taub, published by McGraw-Hill, New York, 1956.

In the event the surface area 10 is a moving surface area which is available for measuring only a short period of time, such as an area on the printing plate of an operating off-set printing press, it is essential that the measuring proper is always carried out with an equal number of measuring light pulses and reference light pulses. To obtain such equal number of pulses, a counter 27 of conventional design is provided. This counter is controlled by a suitable control switch 28 which may be actuated, for instance, by a cam device 128 controlled by the operation of the printing press in that the cam device rotates in synchronism with the surface area 10 of the printing plate.

Figure 4:
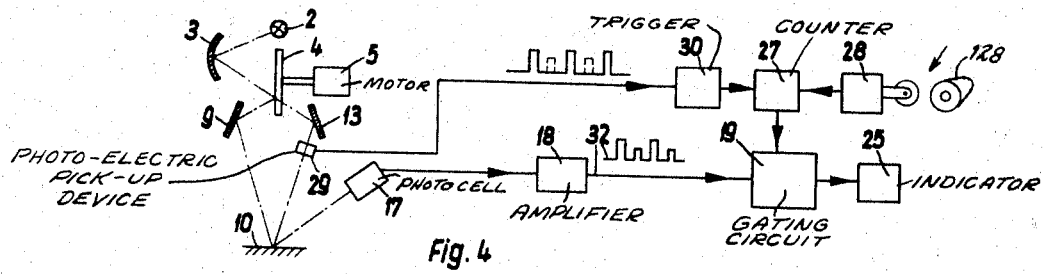
FIG. 4 shows a diagrammatic fragmentary modification of the device and of the block diagram for the modified device.

According to the block diagram of FIG. 4, the trigger pulses for control of the gating circuit are supplied via counter 27 by a trigger circuit 30 which, in turn, is controlled by a photoelectric pick-up 29. This pick-up is shown as being interposed in the optical path of the light pulses reflected by mirror 13 to surface area 10, but it may also be interposed in the optical path of light pulses reflected by mirror 9 to surface area 10. The function of the system shown in FIG. 4 is evident from the previous description.

Figure 5:
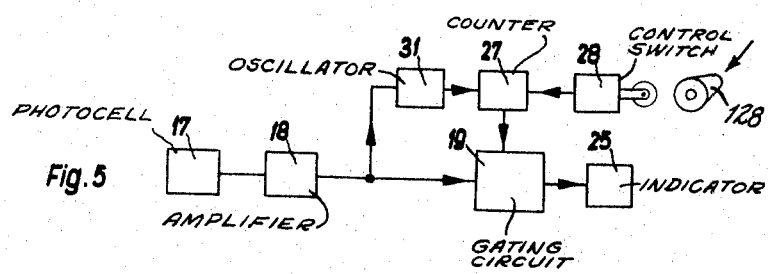
FIG. 5 is a fragmentary block diagram of a further modification of the circuitry for the device.

FIG. 5 shows a block diagram in which the trigger pulses are generated by an oscillator 31, such as an astable multi-vibrator which is synchronized by the incoming signal pulses representing measuring light pulses and reference light pulses.

The circuit components and the function thereof as referred to herein should be visualized as being conventional and may be found in the aforereferred to textbook "Pulse and Digital Circuits" by J. Millmann and H. Taub, published by McGraw-Hill, New York, 1956.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for measuring the thickness of a layer of water on a surface, said device comprising light pulse generating means for sequentially directing a train of monochromic measuring light pulses upon a selected surface area of the layer of water to be measured and a train of monochromic reference light pulses upon the same surface area, the pulses in one of said trains having a wave length different from the wave length of the pulses in the other train, the wave length of the measuring pulses being about $2.95\mu$, and comparing means comparing the ratio of measuring pulses and reference pulses as reflected by said surface area of the layer of water.

2. A device according to claim 1, wherein the wave length of the reference pulses is about $2.55\mu$.

3. A device for measuring the thickness of a layer of water on a surface, said device comprising a pulse forming rotary disc having on one side circumferentially spaced light reflecting surfaces and including apertures interposed between each two light reflecting surfaces, said reflecting surfaces and said apertures being separated by opaque disc portions, a source of light for directing substantially monochromic light upon the side of the disc having thereon said reflecting surfaces, a first light deviating means disposed on the side of the disc having thereon said reflecting surfaces spaced therefrom, a second light deviating means disposed on the opposite side of the disc spaced therefrom, said light deviating means directing pulses of light reflected by said reflecting surfaces and pulses of light passing through said apertures respectively upon the same area of the surface having thereon the water layer to be measured, a light filter means interposed in the optical path between each of said light deviating means and said surface area, said filter means passing light waves of different lengths, the filter means in the optical path of the light deviating means coacting with the apertures in the disc passing light pulses having a wave length of $2.95\mu$, the light pulses reflected by the reflecting surfaces on the disc constituting reference pulses and the light pulses passing the apertures in the disc constituting measuring pulses, light receiving means disposed in an optical relationship with said surface area such that light pulses of different wave lengths are sequentially reflected from said surface upon the receiving means, and comparing means connected with said receiving means, said comparing means comparing the ratio of the measuring pulses and reference pulses received by the receiving means.

4. A device according to claim 3, wherein said disc is divided into a plurality of substantially radially oriented sectors of equal size, said sectors alternately constituting said apertures and said light reflecting surfaces, adjacent sectors being circumferentially separated by opaque disc portions.

5. A device according to claim 3, wherein said filter means coacting with said light reflecting surfaces on the disc has a light wave pass length of about $2.55\mu$.

6. A device according to claim 3, wherein said filter means are stationarily mounted.

7. A device according to claim 3, wherein said source of light has a generally line-shaped light radiant element.

8. A device according to claim 3 and comprising light deviating means optically interposed between said source of light and said disc, said light deviating means imaging light upon said disc in a direction substantially radial to the rotational axis of the disc.

9. A device according to claim 3, wherein said light receiving means comprises photoelectric means for converting light pulses incident thereupon into electric pulse signals, and wherein gating circuit means are connected in circuit with said receiving means and said comparing means, said gating circuit means separating the pulse signal output of the receiving means into signals representing measuring pulses and signals representing reference pulses.

10. A device according to claim 9 and comprising photoelectric pick-up means optically interposed between one of said light deviating means and said surface area, said pick-up means controlling the opening and closing of said gating circuit means to effect said separation of the pulse signals.

11. A device according to claim 9 and comprising oscillating means controlled by the pulse signal outputs of said receiving means and controlling said gating circuit means to effect said separation of the pulse signals.

12. A device according to claim 9 and comprising trigger circuit means connected with said gating circuit means and generating trigger pulses for controlling the opening and closing of gates in said gating circuit means to effect said separation of the pulse signals, and delay circuit means connected in circuit with said trigger circuit means to shift said trigger pulses in time so that said pulses coincide with the light from the source of light impinging upon one of said opaque portions of the disc.

13. A device according to claim 9 and comprising trigger circuit means connected with said gating circuit means and generating trigger pulses for controlling the opening and closing of gates in said gating circuit means to effect said separation of the pulse signals, and pulse shaping means connected in circuit with said trigger circuit means for shaping said trigger pulses so that the same coincide in time with light from the source of light impinging upon one of said opaque portions of the disc.

14. A device according to claim 3 for measuring the thickness of a layer of water on a moving surface, and comprising counting means controlled by the movement of said moving surface and activating the measuring device when the surface area to be examined on said moving surface reaches a predetermined position in reference to the device, said counting means counting a predetermined equal number of measuring light pulses and reference light pulses and deactivating the measuring device when said number is reached.

15. A device according to claim 3 for measuring the thickness of a layer of water on the surface of a printing plate attached to the rotating plate cylinder of a lithographic printing press, and comprising counting means controlled by the rotary movement of the said printing press and activating the measuring device when the surface area to be examined on said printing plate reaches a predetermined positon in reference to the device, said counting means counting a predetermined equal number of measuring light pulses and reference light pulses and deactivating the measuring device when said number is reached.

References Cited
UNITED STATES PATENTS

| 1,450,061 | 3/1923 | Coblentz | 250—226 |
| 2,656,845 | 10/1953 | Lindsay | 250—226 X |
| 3,211,908 | 10/1965 | Leibowitz | 250—83.3 |
| 3,325,649 | 6/1967 | Bird | 250—219 |
| 3,016,464 | 1/1962 | Bailey | 88—14 X |

WALTER STOLWEIN, Primary Examiner.

U.S. Cl. X.R.

88—14; 250—214, 219